United States Patent [19]

Leonard

[11] 4,075,008
[45] Feb. 21, 1978

[54] METHOD FOR THE RECLAMATION OF ZINC FROM GALVANIZING BATHS

[75] Inventor: Ralph William Leonard, Pittsburgh, Pa.

[73] Assignee: United States Steel Corporation, Pittsburgh, Pa.

[21] Appl. No.: 784,004

[22] Filed: Apr. 4, 1977

[51] Int. Cl.² ............................................ C22B 19/30
[52] U.S. Cl. ........................................ 75/86; 75/24; 75/63
[58] Field of Search ................. 75/24, 63, 86–88; 266/227; 427/436

[56] References Cited

U.S. PATENT DOCUMENTS

| 831,123 | 9/1906 | Wagner | 266/227 |
|---|---|---|---|
| 1,515,140 | 11/1924 | Bornemann | 75/88 |
| 1,821,105 | 9/1931 | McMeans | 266/227 |

*Primary Examiner*—M. J. Andrews
*Attorney, Agent, or Firm*—Arthur J. Greif

[57] ABSTRACT

Zinc is removed in a substantially pure form from the dross skimmings of galvanizing baths. The dross is poured into a mold and solidified. The solidified mold is then placed on a permeable base and in the substantial absence of agitation, reheated to a temperature of 420° to 700° C to melt out the zinc in an uncontaminated form.

5 Claims, No Drawings

METHOD FOR THE RECLAMATION OF ZINC FROM GALVANIZING BATHS

This invention relates to a method for the melt-recovery of zinc in a substantially pure form and more particularly relates to the recovery of zinc from top dross that is generated during production of galvanized sheet product in flux-free, aluminum-bearing, hot-dip galvanizing baths.

During continuous galvanizing operations in aluminum-bearing zinc baths, about ten percent of the total zinc is lost as "top dross." This top dross contains zinc oxide, iron-containing intermetallic-compound particles, and elemental zinc. The elemental zinc, present in amounts as high as 90 percent, is entrained with the oxide and iron-containing particles as these accumulations are skimmed from the bath surface to prevent their interfering with the production of prime product. (The amount of iron dissolved in the elemental zinc is generally 0.01 to 0.04 percent). The dross is generally returned to the basic zinc producers who reclaim the zinc by conventional processes, primarily by distillation or electrolytic methods. Overall, therefore, the zinc purchased for continuous galvanizing is used rather uneconomically.

Melt-out techniques for the recovery of zinc from waste products have long been employed as a practical means for the recovery of zinc. U.S. Pat. No. 2,134,605 shows a process for the recovery of zinc from metallic dust, scrapings, etc. wherein the zinc waste is placed in a drum, heated to a high temperature sufficient to melt out the zinc; the drum is then rotated to enhance separation of the molten zinc from the residue. Substantially similar processes are shown in U.S. Pat. Nos. 2,676,010 and 3,198,505. The latter patent is specifically directed to the recovery of zinc entrained in hot dross skimmings which are attendant the melting and refining of aluminum and zinc. Depending on the nature of the initial dross, zinc recoveries of from 30 to 95% of the total weight of the dross have been achieved using such processes. However, when such conventional melt-recovery processes were applied to the recovery of zinc for recycling to hot-dip galvanizing baths, the recovered zinc was found to be unsuitable for such recycling.

It is therefore a principal object of the instant invention to provide a method for the melt-recovery (liquation) of zinc, wherein the zinc is recovered in a substantially pure form, suitable for recycle to a hot-dip galvanizing bath.

It is a further object of this invention to provide a process for decreasing the amount of Zn which must be returned to the primary Zn producer.

In a manner somewhat analogous to a procedure shown in U.S. Pat. No. 3,198,505, top dross from a galvanizing bath was skimmed, placed on a permeable plate and heated to permit the entrained zinc to flow through the holes in the plate. Utilizing such a procedure, it was found that the melted-out zinc contained an excess of particles of intermetallic compounds. When zinc recovered in this manner is recycled to the galvanizing bath, it results in sandy or lumpy coatings on the coated steel product. It was found, however, that these contaminant particles could be essentially eliminated by modifying such melt-recovery techniques in accord with the following procedure:

The molten dross is poured into a mold for the formation of the dross ingot. The dross in the mold is thereafter cooled to a temperature below about 420° C and low enough to form a substantially solid (minor amounts of molten zinc may be present within the ingot) ingot. Thereafter, in the manner somewhat analogous to the prior art procedures, but in the absence of agitation; the solid ingot is placed on a permeable support, e.g. a perforated shell or a metal grid, and reheated for a short time to a temperature above the melting point of zinc, generally within the range 420° to 700° C to melt out the zinc therefrom. The elemental zinc phase which melts and flows through the permeable base is then collected below. It was found, surprisingly, even when zinc was present in amounts as high as 90% of the total ingot, that ingots prepared and heated in this manner remained relatively in tact, with very little change in shape on the permeable base. The structural integrity during heating is provided by the zinc oxide particles intertwined throughout the dross ingot. It is this structural integrity of the ingot, coupled with the absence of the detrimental degree of agitation (agitation which causes the ingot to break-up) which permits the recovery of zinc in a pure form—essentially uncontaminated by high-melting point, intermetallic compounds of zinc, such as $Fe_2(Al, Zn)_5$. It is this and other similar high melting point intermetallic compounds which normally would contaminate the zinc if it were melted-out, utilizing conventional melt recovery techniques. Apparently, the ingot integrity not only prevents the oxide particles from being entrained within the pure molten zinc; but more importantly, the resultant oxide network forms a highly efficient filter system which prevents the flow-through of the contaminant iron-containing compounds. Results achieved, utilizing the instant melt-out technique, on dross from two different galvanizing lines are presented in Table I.

TABLE 1

| | Effect of Temperature on the Amount[1] and Purity[1] of Zn Recovered | | | | | |
|---|---|---|---|---|---|---|
| | Line No. 1 | | | Line No.2 | | |
| Temperature of Liquation, °C | %Zn Recovered | Iron, % | Al, % | %Zn Recovered | Iron, % | Al, % |
| 454 | 28.5 | 0.02 | 0.08 | 45.9 | 0.02 | 0.12 |
| 520 | 34.7 | 0.04 | 0.11 | 41.0 | 0.03 | 0.12 |
| 566 | 36.5 | 0.06 | 0.11 | 40.5 | 0.07 | 0.14 |
| 677 | 47.1 | 0.05 | 0.06 | 55.7 | 0.03 | 0.12 |
| 704 | 53.1 | 0.15 | 0.13 | 55.8 | 0.10 | 0.20 |

[1]Results, at each reported temperature, are the average of at least three tests for each dross source Between 28.5 and 55.7% of the initial dross ingot weight was recovered as low-iron zinc (even though the iron solubility in zinc at 677° C, for example, is about 3%) using liquation temperatures between 454° and 677° C. As evidenced from the Table, as a result of (i) the initial formation of a dross ingot and (ii) the absence of agitation, the iron-aluminum-zinc particles in the ingots exhibited virtually no tendency to go into solution at temperatures below 680° C. Therefore, high liquation temperatures can be employed to obtain commercially practicable recovery rates without adversely affecting the iron and intermetallic particle contents of the recovered zinc. At 704° C the iron content of the recovered zinc increased to 0.10 to 0.15 percent, indicating that the iron-aluminum-zinc particles were beginning noticeably to break down and contaminate the recovered zinc. It is therefore preferable to employ liquation temperatures below 680° C.

In its specific application to the recovery of entrained zinc from the dross recovered from continuous galvanizing baths; the instant method may be employed to effect the liquation recovery of (i) top dross skimmed from the surface of the bath or (ii) bottom dross; normally recovered by dredging the bottom of the bath during a time when production is halted. Bottom dross is a significant part of the total dross generated on some continuous strand galvanizing lines, particularly on those lines that utilize steel pots for containment of the molten zinc bath. This bottom dross consists of a mixture of elemental zinc and iron containing particles, primarily the iron-zinc compound $FeZn_7$. The latter compound precipitates out of the molten zinc bath, when the iron that dissolves into the bath by reaction with the steel strip, the pot, and the submerged construction materials exceeds the solubility limit. The density of $FeZn_7$ particles is slightly higher than that of zinc, i.e. about 7.2 vs. 7.1 gms/cm$^3$; thus the particles tend to settle to the bottom of the galvanizing pot. This build-up of iron-containing, bottom dross particles in the bath also produces sandy or lumpy coatings, similar to that produced by iron-aluminum-zinc particles. It was found that this bottom dross resulting from iron-zinc particles formed and remained stable in galvanizing baths, only when aluminum concentration in the bath was less than about 0.15 percent. At greater aluminum concentrations, excess iron dissolving from the strip and the pot combined with the aluminum to form top dross compounds only. Thus, in a preferred embodiment of the instant invention, the bottom dross is initially transformed to a top dross compound by the addition of sufficient aluminum, either in the bath or in a separate pot, to increase the aluminum concentration to above 0.15 percent. Utilizing such aluminum additions to transform the bottom dross to top dross thereby permits more convenient removal by skimming and the achievement of enhanced recovery by the liquation technique of the instant invention.

I claim:

1. In the liquation process for the recovery of Zn entrained in dross removed from Zn base melts, the improvement for recovering said entrained Zn in a form essentially uncontaminated by high melting point, intermetallic compounds, said improvement comprising, pouring molten dross into a mold for the formation of a dross ingot, cooling the molten dross to a temperature below about 420° C and sufficient to form a substantially solid ingot therefrom, on a permeable support and in the absence of detrimental agitation, reheating said solid ingot to a temperature of 420° to 700° C to melt-out said uncontaminated Zn therefrom.

2. The method of claim 1, wherein said Zn base melt is a bath employed for the hot-dip galvanizing of steel strand, said bath consisting essentially of Fe in the weight percent range 0.01 to 0.04, and Al in the weight percent range 0.1 to 0.4.

3. The method of claim 2, wherein said dross is top-dross recovered by skimming the surface of said bath.

4. The method of claim 3, wherein said reheating is conducted at a temperature below 680° C and the melted-out Zn is returned to the hot-dip galvanizing bath.

5. The method of claim 4, wherein the Al content of said bath is at least 0.15 percent, immediately prior to skimming said top dross.

* * * * *